(12) United States Patent
Maxson et al.

(10) Patent No.: US 10,913,194 B2
(45) Date of Patent: Feb. 9, 2021

(54) DEVICE AND METHOD FOR CONTINUOUSLY EXTRUDING TUBING HAVING DIFFERENT MATERIALS

(71) Applicant: GRAHAM ENGINEERING CORPORATION, York, PA (US)

(72) Inventors: Stephen Decatur Maxson, Hickory, NC (US); Vincent Carter, Red Lion, PA (US); Kristopher J. Ivie, Hallam, PA (US)

(73) Assignee: GRAHAM ENGINEERING CORPORATION, York, PA (US)

(*) Notice: Subject to any disclaimer, the term of this patent is extended or adjusted under 35 U.S.C. 154(b) by 406 days.

(21) Appl. No.: 15/479,549

(22) Filed: Apr. 5, 2017

(65) Prior Publication Data

US 2017/0291344 A1  Oct. 12, 2017

Related U.S. Application Data

(60) Provisional application No. 62/319,051, filed on Apr. 6, 2016.

(51) Int. Cl.
| | |
|---|---|
| *B29C 48/21* | (2019.01) |
| *B29C 48/09* | (2019.01) |
| *B29C 48/30* | (2019.01) |
| *B29C 48/92* | (2019.01) |
| *B29C 48/345* | (2019.01) |
| *B29C 48/255* | (2019.01) |
| *B29C 48/49* | (2019.01) |
| *B29C 48/71* | (2019.01) |

(52) U.S. Cl.
CPC .............. *B29C 48/09* (2019.02); *B29C 48/21* (2019.02); *B29C 48/2552* (2019.02); *B29C 48/345* (2019.02); *B29C 48/92* (2019.02); *B29C 48/49* (2019.02); *B29C 48/71* (2019.02); *B29C 2948/926* (2019.02); *B29C 2948/92876* (2019.02)

(58) Field of Classification Search
CPC ............................... B29C 48/19; B29C 48/21
See application file for complete search history.

(56) References Cited

U.S. PATENT DOCUMENTS

| | | | | |
|---|---|---|---|---|
| 5,725,814 A | * | 3/1998 | Harris | ..................... B29C 48/30 264/40.3 |
| 6,135,992 A | * | 10/2000 | Wang | ................ A61M 25/0009 604/525 |
| 2003/0047825 A1 | * | 3/2003 | Visconti | ................ B29C 31/044 264/40.1 |

(Continued)

*Primary Examiner* — Robert A Vetere
(74) *Attorney, Agent, or Firm* — Saxton & Stump LLC

(57) ABSTRACT

A co-injection extrusion apparatus and method. The first extruder cooperates with a first material delivery channel for delivering a first material to a die. The second extruder cooperates with a second material delivery channel for delivering a second material to a die. A first plunger is positioned in the first material delivery channel and a second plunger is positioned in the second material delivery channel. The plungers are movable between a first position in which to the plunger is extended in a respective material delivery channel toward the die, and a second position in which the plunger is retracted in the respective material delivery channel away from the die.

14 Claims, 5 Drawing Sheets

(56) References Cited

U.S. PATENT DOCUMENTS

| 2003/0071073 A1* | 4/2003 | Zimmet | B29C 45/532 |
| | | | 222/234 |
| 2004/0183224 A1* | 9/2004 | Balzer | B29C 48/3366 |
| | | | 264/171.26 |
| 2004/0231820 A1* | 11/2004 | Hirai | B22D 17/04 |
| | | | 164/113 |

\* cited by examiner

DEVICE AND METHOD FOR CONTINUOUSLY EXTRUDING TUBING HAVING DIFFERENT MATERIALS

FIELD OF THE INVENTION

The invention relates to a device and method for continuously extruding tubing having different materials. In particular, the invention is directed to a polymer extrusion system and method for varying the content of material along the length of the extruded tubing.

BACKGROUND OF THE INVENTION

Tubes, pipe, sheet, film, profiles and other extruded products made of plastic, for example, have different characteristics that depend on the particular plastic being used. One plastic will be very flexible, while another will be very stiff. One may be transparent, while another is opaque, etc. For many applications, it would be desirable to make an extruded product that is a coextrusion of two or more materials that changes from one material to another abruptly or gradually or that varies along its length in the relative content of the two or more constituent materials.

Coextrusion is a process by which two or more extruders are connected to a single, coextrusion die. The individual extruders feed to the die differing materials; by differing materials, it is meant not just different types of materials such as nylon and polyurethane, but materials of differing characteristics or qualities, such as color, opacity or density. An example of a coextruded product is a tube extruded by a pair of extruders feeding a coextrusion die that directs a first material to the outside of the extruded tube and directs a second material to the inside of the tube. The result is a coaxial, two-layer, tubular extrusion.

Extruders have been connected directly to coextrusion dies, but with less than optimum results. A known plastic extruder, for example, is a device that has a large barrel with a large servo motor driven screw. Plastic pellets are put into a hopper end. A molten plastic stream comes out the other end. Since the screw is an inefficient pump, it generates much friction and heat as it turns. Enough energy is converted from the mechanical energy of the screw into heat energy to melt the plastic. The plastic stream eventually gets forced through the die, forming it into garden hose, medical catheters, tubing, sheet, etc.

An extruder screw, however, is not a positive displacement pump. The amount of plastic which comes out the exit end is not exactly proportional to the speed of the screw. The throughput varies with the viscosity of the plastic, the pressure at the die and other variables.

If one varies the speeds of the extruders of a coextrusion system, one theoretically varies the amount of each of the extruded materials. However, with extruders, this variation cannot be precisely controlled and it is virtually impossible to change relatively quickly from one material to the other, or to vary the content so that the extruded material changes gradually in a precisely controlled fashion from one material to another. If an extruder screw is stopped, there is still a great deal of plastic that can come out of the grooves of the screw ("drool"). Consequently, if extruders are used for the above-mentioned scheme for varying the material content, there are several problems, which include: i) the inertia of the screw in an extruder is high; ii) the output of an extruder is not linear with speed; iii) the drool from the extruders is difficult to predict and control; and iv) the output of each extruder is affected not only by what happens in that extruder, but also by what happens in all of the others.

One known way to change from one extruded material to another is the use of a dump valve to effect the change. The dump valve allows one material to go into the die while the other is diverted and discarded in the scrap bin. The two flows can then be reversed as required. In this system, the screws run at a constant rate while generating a significant amount of waste material. Additionally, the individual die layers experience inconsistent melt flow.

Another alternative is to use melt gear pumps in addition to the screws, as described in U.S. Pat. No. 5,725,814. In this type of system, control of the speed of the gear pumps controls the amount of each material emergent from the pumps. However, this type of system suffers from the individual die layers experience inconsistent melt flow. In addition, the screws cannot be run at a constant pace.

It would, therefore, be beneficial to provide an extrusion device, system and method capable of extruding two or more materials with repeatability, stability and predictability and which is capable of abrupt or gradual changeover of materials.

SUMMARY OF THE INVENTION

An object is to provide an extrusion apparatus with a continuous and constant screw rotation for uniform melt and which has a fast transition changing from one material to another.

An object is to provide an extrusion apparatus which has the ability to produce multiple layer extrusions, with one or more layer having multiple, alternating materials.

An object is to provide plungers in material flow paths to control the flow of material or melt to the die, while allowing the screws of extruders to operate at a constant speed.

An object is to provide plungers in material flow paths to control the flow of material or melt to the die, thereby also controlling unwanted drool.

An embodiment is directed to a co-injection molding or extrusion apparatus which includes a first extruder and a second extruder. The first extruder cooperates with a first material delivery channel for delivering a first material to a die. The second extruder cooperates with a second material delivery channel for delivering a second material to a die. A first plunger is positioned in the first material delivery channel and a second plunger is positioned in the second material delivery channel. The first plunger is movable between a first plunger first position in which to the first plunger is extended in the first material delivery channel toward the die, and a first plunger second position in which the first plunger is retracted in the first material delivery channel away from the die. The second plunger is movable between a second plunger first position in which to the second plunger is extended in the second material delivery channel toward the die, and a second plunger second position in which the second plunger is retracted in the second material delivery channel away from the die.

An embodiment is directed to a co-injection extruding or molding apparatus which includes a first extruder and a second extruder. The first extruder cooperates with a first material delivery channel for delivering a first material to a die. A first plunger is positioned in the first material delivery channel and is provided in a portion of the first material delivery channel positioned proximate the die. The second extruder cooperates with a second material delivery channel for delivering a second material to the die. The second plunger is positioned in the second material delivery channel and is provided in a portion of the second material delivery channel positioned proximate the die. The first plunger is movable from a first plunger first position in which the first plunger is extended in the first material delivery channel toward the die, and a first plunger second position in which the first plunger is retracted in the first material delivery channel away from the die. As the first plunger is moved to the extended position, the first material is forced from the portion of the first material delivery channel to the die. As the first plunger is moved to the retracted position, the flow of the first material from the portion of the first material delivery channel to the die is slowed or stopped. The second plunger is movable from a second plunger first position in which to the second plunger is extended in the second material delivery channel toward the die, and a second plunger second position in which the second plunger is retracted in the second material delivery channel away from the die. As the second plunger is moved to the extended position, the second material is forced from the portion of the second material delivery channel to the die. As the second plunger is moved to the retracted position, the flow of the second material from the portion of the second material delivery channel to the die is slowed or stopped. A controller controls the movement of the first plunger between the first plunger first position and the first plunger second position and the controller controls the movement of the second plunger between the second plunger first position and the second plunger second position.

An embodiment is directed to method of co-extruding material. The method includes: providing first extruded material through a first material delivery channel to a die; providing second extruded material through a second material delivery channel to a die; controlling the flow of the first extruded material through the first material delivery channel by a first plunger positioned in the first material delivery channel; and controlling the flow of the second extruded material through the second material delivery channel by a second plunger positioned in the second material delivery channel.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
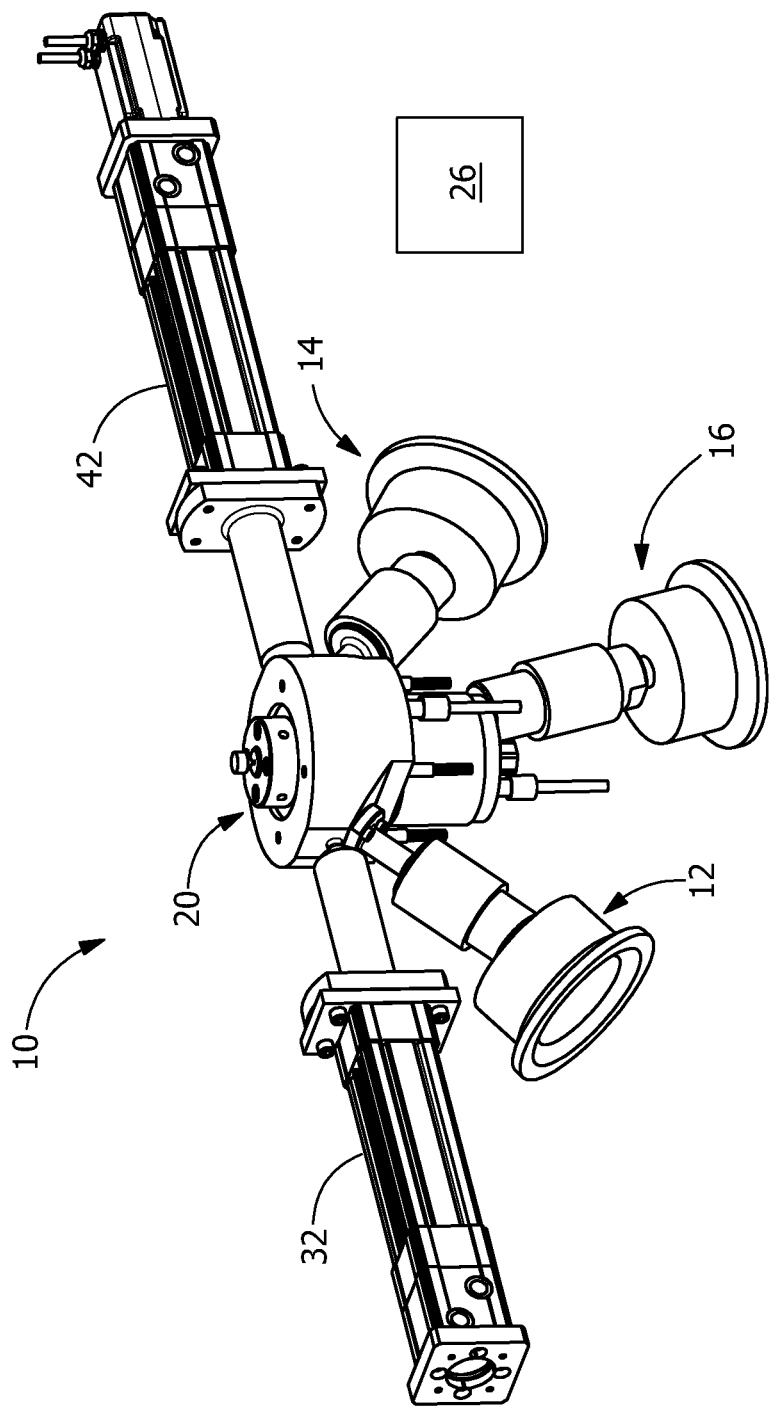
FIG. 1 is a perspective view of an illustrative extrusion apparatus of the present invention with three extruders.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 2:
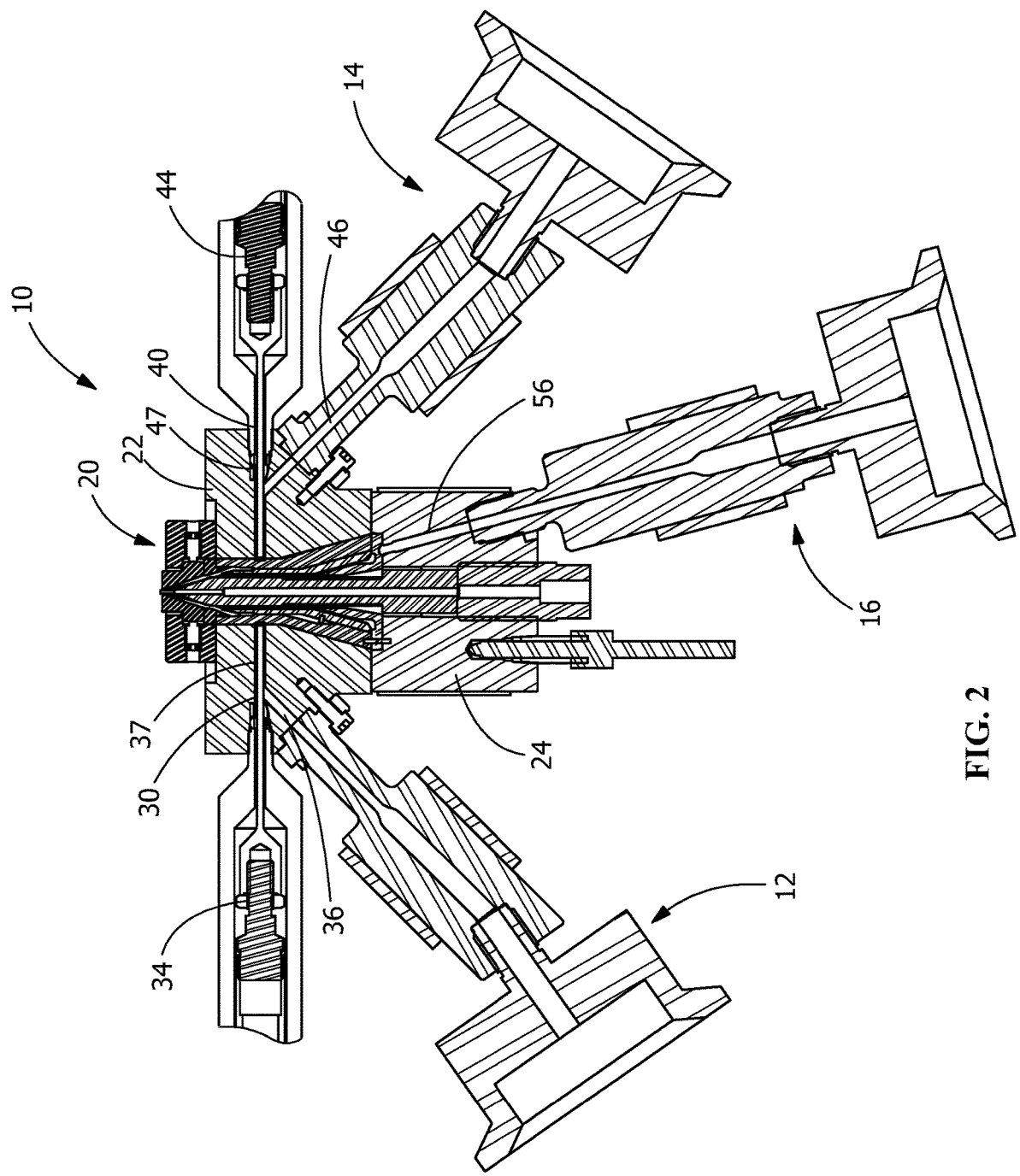
FIG. 2 is a cross-section view of the extrusion apparatus of claim 1, showing the material delivery channels of the extruders.

An illustrative embodiment of a co-injection molding or extrusion apparatus 10 and system is shown in FIGS. 1 and 2. In this embodiment, a first extruder 12 and second extruder 14 are provided to supply material through a die 20 outer layer 22. A third extruder 16 is provide to supply material through the die 20 inner layer 24. The extruders have heater bands and other features known in the industry and operate in a manner known in the industry. One or more controllers 26 are provided to control the speed of the screw drive motors (not shown) that drives the screws (not shown) of the extruders 12, 14, 16. The controllers 26 may be hardwired to the apparatus 10 or may be wireless connected to the apparatus 10.

In various embodiments, an air supply is provided to control the inside diameter of extruded tubing. A water trough may receive the material extruded from the die 20. A conventional puller may be provided to pull the material extruded from the die 20 through the water trough. A drive motor of the puller is controlled of the controller 26. A cutter may also be provided to sever or cut the material extruded from the die 20 into desired lengths at desired locations. The cutter is also controlled by the controller 26. Other features, such as, but not limited to, a controllable air supply and laser gauge may be provide and are known in the art.

Figure 3:
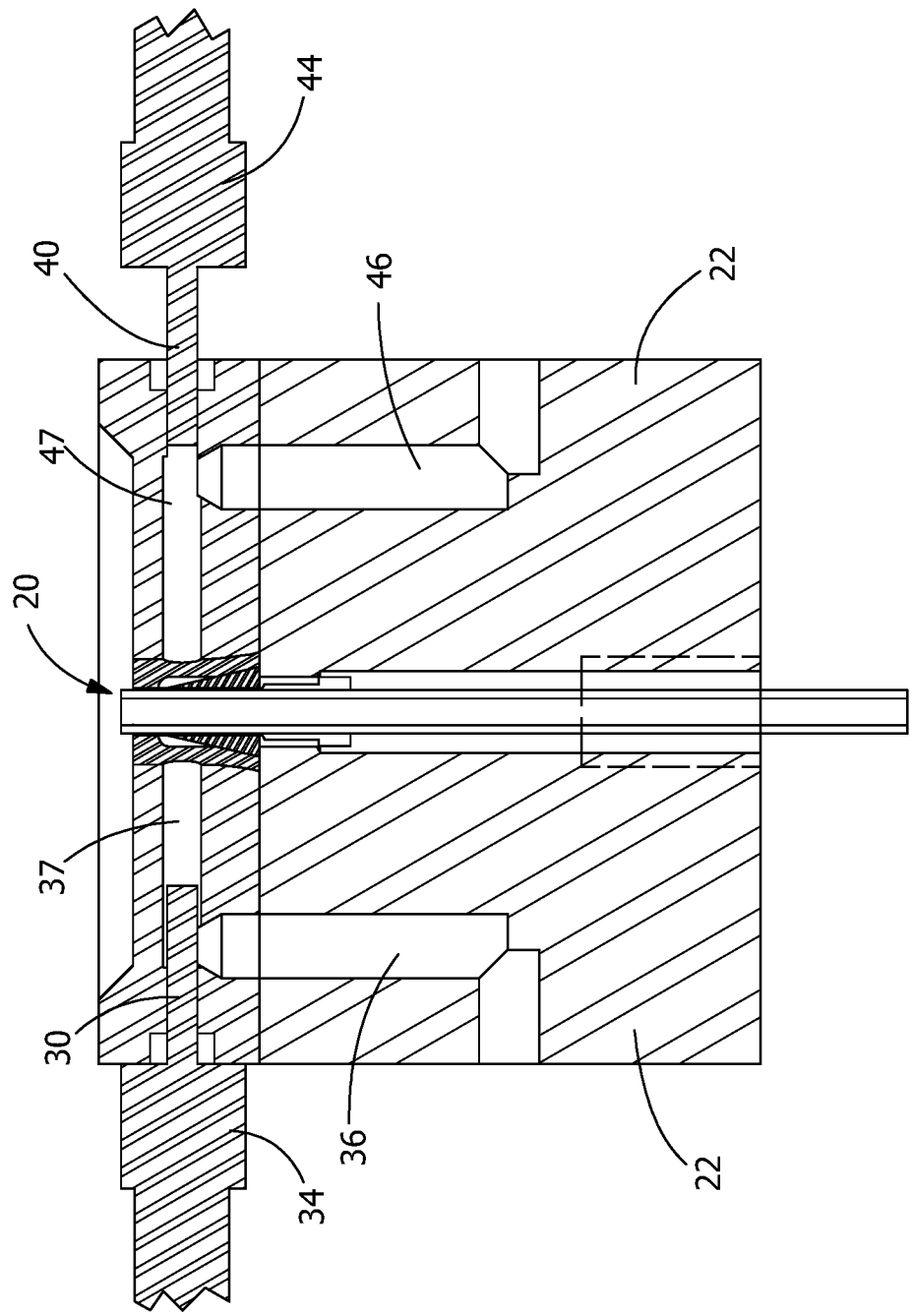
FIG. 3 is an enlarged cross-sectional view of an alternate embodiment of the extrusion apparatus, illustrating a first plunger in a closed position in a first material delivery channel and a second plunger in an open position is a second material delivery channel.
Figure 4:
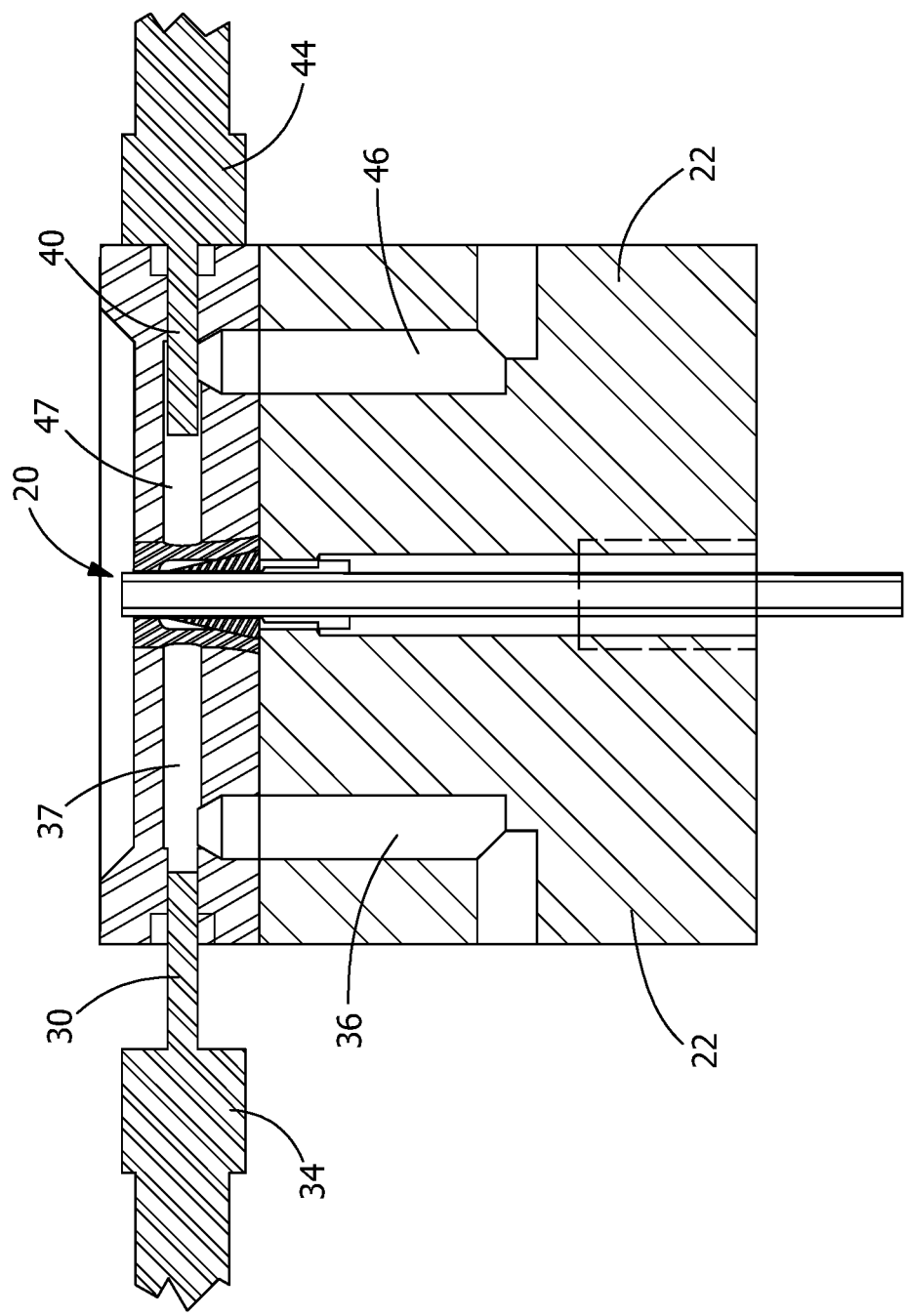
FIG. 4 is an enlarged cross-sectional view of the alternate embodiment of the extrusion apparatus of FIG. 3, illustrating the first plunger in an open position in the first material delivery channel and the second plunger in a closed position is the second material delivery channel.

The rate of delivery of the respective materials, or "melt," by the first extruder 12 to the outer layer 22 of the die 20 is controlled by the speed of the screw of the first extruder 12 and the position and speed of the plunger or pin 30 controlled by the position controlled actuator 32. As best shown in FIG. 2, the illustrative position controlled actuator 32 is a cylindrical electro-mechanical member having actuation member 34 which is moved between a first position and a second position. The actuation member 34 may be driven by a servo motor (not shown) which is controlled by the controller 26. The plunger 30 is movable from between a first or extended position, as shown in FIG. 3, and a second or retracted position, as shown in FIG. 4. In the first position, the actuation member 34 cooperates with the plunger 30 to position the plunger 30 in the extended position in the material delivery channel 36, as shown in FIG. 3. In the second position, the actuation member 34 cooperates with the plunger 30 to position the plunger 30 in the retracted position in the material delivery channel 36, as shown in FIG. 4.

As the plunger 30 is moved from the retracted position to the extended position, the plunger 30 cooperates with the material in the material delivery channel 36. The movement of the plunger 30 toward the extended position and toward the die 20 causes the material provided in the bottom portion 37 of the material delivery channel 36 to be forced from the bottom portion 37 of the material delivery channel 36 to the die 20. The amount of volume of the material which flows from the bottom portion 37 of the material delivery channel 36 to the die 20 when the plunger 30 is moved toward the extended position is controlled by the speed of the plunger 30 and the speed of the speed of the screw of the first extruder 12.

As the plunger 30 is moved from the extended position to the retracted position, the plunger 30 creates a vacuum or area of low pressure in the bottom portion 37 of the material delivery channel 36. The movement of the plunger 30 toward the retracted position and away from the die 20 causes a void in the bottom portion 37 of the material delivery channel 36 in which the material can accumulate, thereby slowing or preventing the material from flowing to the die 20. The amount of volume of the material which flows from the bottom portion 37 of the material delivery channel 36 to the die 20 as the plunger 30 is retracted from the die 20 is controlled by the speed of the plunger 30 and the speed of the screw of the first extruder 12. In one illustrative embodiment, as the plunger 30 is retracted, material continues to accumulate in the bottom portion 37 of the material delivery channel 36 at a continuous and constant rate, as the screw of the first extruder 12 is operated at a constant rate.

Both the speed of the plunger 30 and the speed of the screw of the first extruder 12 are controlled by the controller 26. The controller is programmed to properly control the flow of the material based on various factors, including, but not limited to, the material used and the device being extruded from the die 20. The amount of material which flows through the material delivery channel 36 is directly proportional to controlled movement of the plunger 30 in the material delivery channel 36.

The rate of delivery of the respective materials, or "melt," by the second extruder 14 to the outer layer 22 of the die 20 is controlled by the speed of the screw of the second extruder 14 and the position and speed of the plunger or pin 40 controlled by the position controlled actuator 42. As best shown in FIG. 2, the illustrative position controlled actuator 42 is a cylindrical electro-mechanical member having actuation member 44 which is moved between a first position and a second position. The actuation member 44 may be driven by a servo motor (not shown) which is controlled by the controller 26. The plunger 40 is movable from between a first or extended position, as shown in FIG. 4, and a second or retracted position, as shown in FIG. 3. In the first position, the actuation member 44 cooperates with the plunger 40 to position the plunger 40 in the extended position in the material delivery channel 46, as shown in FIG. 4. In the second position, the actuation member 44 cooperates with the plunger 40 to position the plunger 40 in the retracted position in the material delivery channel 46, as shown in FIG. 3.

As the plunger 40 is moved from the retracted position to the extended position, the plunger 40 cooperates with the material in the material delivery channel 46. The movement of the plunger 40 toward the extended position and toward the die 20 causes the material provided in the bottom portion 47 of the material delivery channel 46 to be forced from the bottom portion 47 of the material delivery channel 46 to the die 20. The amount of volume of the material which flows from the bottom portion 47 of the material delivery channel 46 to the die 20 when the plunger 40 is moved toward the extended position is controlled by the speed of the plunger 40 and the speed of the speed of the screw of the first extruder 12.

As the plunger 40 is moved from the extended position to the retracted position, the plunger 40 creates a vacuum or area of low pressure in the bottom portion 47 of the material delivery channel 46. The movement of the plunger 40 toward the retracted position and away from the die 20 causes a void in the bottom portion 47 of the material delivery channel 46 in which the material can accumulate, thereby slowing or preventing the material from flowing to the die 20. The amount of volume of the material which flows from the bottom portion 47 of the material delivery channel 46 to the die 20 as the plunger 40 is retracted from the die 20 is controlled by the speed of the plunger 40 and the speed of the speed of the screw of the first extruder 12. In one illustrative embodiment, as the plunger 40 is retracted, material continues to accumulate in the bottom portion 47 of the material delivery channel 46 at a continuous and constant rate, as the screw of the second extruder 14 is operated at a constant rate.

Both the speed of the plunger 40 and the speed of the screw of the second extruder 14 are controlled by the controller 26. The controller is programmed to properly control the flow of the material based on various factors, including, but not limited to, the material used and the device being extruded from the die 20. The amount of material which flows through the material delivery channel 46 is directly proportional to controlled movement of the plunger 40 in the material delivery channel 46.

The rate of delivery of the respective materials, or "melt," by the third extruder 16 to the inner layer 24 of the die 20 is controlled by the speed of the screw of the third extruder 12. In the embodiment shown, the material delivery channel 56 (FIG. 2) of third extruder 16 does not have a plunger or position controlled actuator, as only one material is used for the inner layer. However, if more than one material is needed for the inner layer and an additional extruder is used, plunger and position controlled actuators may be included and operate as described above.

If the characteristics, such as shrinkage and stretching, that effect the cross sectional dimension of the product are the same for the two materials 60 and 62 (FIG. 5), then the gradual change-over from one material to the other with no change in the inside and outside diameters can be effected by movement of the plunger 30 in the material delivery channel 36 from the extended position to the retracted position simultaneously, and at the same speed, as the movement of the plunger 40 in the material delivery channel 46 from the retracted position to the extended position. In other words, the plunger 30 and plunger 40 move at the same rates when pushing material and at a rate matching the output of the extruder when retracting, but entirely out of phase. This assumes that the first extruder 12 and second extruder 14 and the material delivery channel 36 and material delivery channel 46 are of identical size, whereas if they vary in size a compensating correction of the movement of the plunger 30 relative to the plunger 40 is required.

If material characteristics such as shrinkage or stretching differ between the two materials 60 and 62, compensatory changes in the speed of extending or retracting one or both of the plungers 30, 40 may be required to maintain a constant inside and outside diameter.

As is shown in FIG. 2, the plunger 30 positioned in the material delivery channel 36 and the plunger 40 positioned in the material delivery channel 46 are positioned proximate the die 20. When the plunger 30 is retracted and the plunger 40 is extended, there will be only a small Bernoulli effect sucking plastic out of the material delivery channel 36, but it will be greatly reduced because of the short path provided between the plunger 30 and the die 20 and because the pressure in the material delivery channel 36 proximate the die is decreased when the plunger 30 is retracted. Similarly, when the plunger 40 is retracted and the plunger 30 is extended, there will be only a small Bernoulli effect sucking plastic out of the material delivery channel 46, but it will be greatly reduced because of the short path provided between the plunger 40 and the die 20 and because the pressure in the material delivery channel 46 proximate the die is decreased when the plunger 40 is retracted. Adding the plungers 30, 40 at the output of the material delivery channel 36, 46 for each material in a multi-material or multilayer coextrusion reduces or effectively eliminates the drool from one material while the other material is moving the material or melt. In effect, the use of the plungers 30, 40 effectively shuts off the flow of the material or melt path to the die 20 from material delivery channel 36, 46 if not active.

The controller 26 may be used to control the extruders 12, 14, 16, the position controlled actuators 32, 42, the plungers 30, 40, and other operating parameters to compensate for differences such as the same extrusion conditions not producing the same dimensions in different polymers, due to differences in the ductility and other characteristics of the polymers.

As discussed above, the method of co-extruding material according to the present invention includes: providing first extruded material through a first material delivery channel to a die; providing second extruded material through a second material delivery channel to a die; controlling the flow of the first extruded material through the first material delivery channel by a first plunger positioned in the first material delivery channel; and controlling the flow of the second extruded material through the second material delivery channel by a second plunger positioned in the second material delivery channel.

The method may further include moving the first plunger from a first plunger first position in which to the first plunger is extended in the first material delivery channel toward the die, and a first plunger second position in which the first plunger is retracted in the first material delivery channel away from the die. Wherein as the first plunger is moved to the extended position, the first extruded material is forced from the portion of the first material delivery channel to the die, and wherein as the first plunger is moved to the retracted position, the flow of the first extruded material from the portion of the first material delivery channel to the die is slowed or stopped.

The method may further include moving the second plunger being from a second plunger first position in which to the second plunger is extended in the second material delivery channel toward the die, and a second plunger second position in which the second plunger is retracted in the second material delivery channel away from the die. Wherein as the second plunger is moved to the extended position, the second extruded material is forced from the portion of the second material delivery channel to the die, and wherein as the second plunger is moved to the retracted position, the flow of the second extruded material from the portion of the second material delivery channel to the die is slowed or stopped.

The method may further include positioning the first plunger in a portion of the first material delivery channel positioned proximate the die, and/or positioning the second plunger in a portion of the second material delivery channel positioned proximate the die.

The method may further include providing third extruded material through a third material delivery channel to the die. Wherein the die has an outer layer and an inner layer, the first material delivery channel and the second material delivery channel cooperating with the outer layer of the die and the third material delivery channel cooperating with the inner layer of the die.

Figure 5:
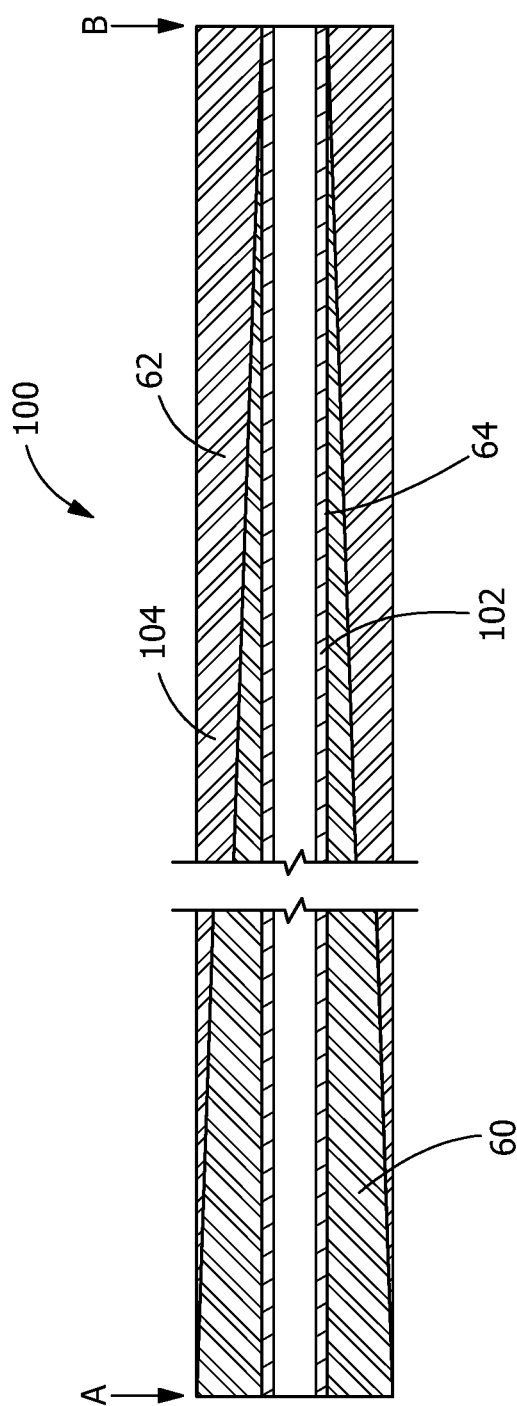
FIG. 5 is a cross-section of an illustrative extruded tube made by the extrusion apparatus of FIG. 1.

FIG. 5 illustrates an exemplary tubular extrusion 100 which is made using the apparatus 10. The tubular extrusion 100 has an inner layer 102 and an outer layer 104. The inner layer 102 is made from a first material 64. The outer layer 104 is coextruded from a second material 60 and a third material 62. The inside and outside diameters of the extruded layers 102, 104 remain substantially constant along its length. With respect to the outer layer 104, the content of the two materials 60, 62 varies from a location A where the extrusion of the outer layer 104 is entirely the material 60 to a location B where the extrusion of the outer layer 104 is entirely of the material 62. Such an extrusion is produced by controlling the positioning of the plunger 30 in the material delivery channel 36 and controlling the positioning of the plunger 40 in the material delivery channel 46, as described above.

An example of such a tubular extrusion 100 is used as a catheter. The inner layer 102 is made using EFEP material, a terpolymer made from ethylene, tetrafluoroethylene (TFE) and hexafluoropropylene (HFP). Such EFEP material is produced by Daikin, and is hereby incorporated by reference. The outer layer 104 is made from two different materials having different durometers. For example, one material may be a hard polymer, such as, but not limited to, an EMS thermoplastic polymer manufactured by Grivory, and the other material may be a soft polymer, such as, but not limited to, a PEBA elastomer manufactured by Evonik.

Such materials may be combined to produce a tubular extrusion which has different material properties in different sections of the tubular extrusions. The materials may also be selected to facilitate the continuous extrusion of the tubular materials. In the example above, the EFEP, EMS and PEBA materials do not require etching to allow the material to bond together, thereby allowing for the tubular member to be continuously extruded without the need for intermediate operations, such as etching, to be performed.

Advantages of the present invention include, but are not limited to: i) the material delivery channel or melt chambers are configured such that the melted material spends minimal time in the material delivery channel; ii) the built in melt chambers allow the screws to run at a constant rate; and iii) the plungers facilitate the movement of the materials through the die at a constant rate.

Additionally, the use of the plungers is advantageous at least because: i) the plungers provide good positional and velocity control and are easily programmed to provide consistent feeding of the material; ii) no waste is generated from dump valves; iii) the extruder screws can be run at a constant speed; and iv) the ends of the material delivery channels and the plungers are positioned adjacent or proximate to the infeed for the die.

While the illustrative embodiment has three extruders 12, 14, 16, other numbers of extruders can be used. For example, an extruded device that is made of four materials may require four extruders and four plungers to control the material in four material delivery channel. In addition, it is not necessary to run all extruders, and consequently, an extruded device of one, two, or three materials can be extruded on an assembly with four extruders.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A co-injection extrusion apparatus comprising:
a die having an infeed;
a first extruder having a first screw;
a first material delivery channel for delivering a first material to the infeed of the die, the first material delivery channel having a first upper portion and a first lower portion, the first lower portion is positioned adjacent to the infeed of the die, the first screw is positioned in the first upper portion;
a second extruder having a second screw;
a second material delivery channel for delivering a second material to the infeed of the die, the second material delivery channel having a second upper portion and a second lower portion, the second lower portion is positioned adjacent to the infeed of the die and in line with the first lower portion, the second screw is positioned in the second upper portion;
a first plunger positioned in the first lower portion of the first material delivery channel proximate to the infeed of the die;
a second plunger positioned in the second lower portion of the second material delivery channel proximate to the infeed of the die;
the first plunger being movable between a first plunger first position in which the first plunger is extended in the first lower portion of the first material delivery channel toward the infeed of the die, and a first plunger second position in which the first plunger is retracted in the first lower portion of the first material delivery channel away from the infeed of the die, the first plunger configured to creates a vacuum or area of low pressure as the first plunger is moved from the first plunger first position to the first plunger second position, allowing the flow rate of the first material into the infeed of the die to be slowed or stopped without requiring a change in the flow of the first material from the first screw into the first lower portion of the first material delivery channel;
the second plunger being movable between a second plunger first position in which the second plunger is extended in the second lower portion of the second material delivery channel toward the infeed of the die, and a second plunger second position in which the second plunger is retracted in the second lower portion of the second material delivery channel away from the infeed of the die, the second plunger configured to creates a vacuum or area of low pressure as the second plunger is moved from the first plunger first position to the second plunger second position, allowing the flow rate of the second material into the infeed of the die to be slowed or stopped without requiring a change in the flow of the second material from the second screw into the second lower portion of the second material delivery channel.

2. The co-injection extrusion apparatus of claim 1, wherein the die has an outer layer and an inner layer, the first material delivery channel and the second material delivery channel cooperating with the outer layer.

3. The co-injection extrusion apparatus of claim 2, wherein a third extruder and a third material delivery channel for delivering a third material to cooperate with the inner layer of the die.

4. The co-injection extrusion apparatus of claim 3, wherein the first material is a thermoplastic polymer, the second material is an elastomer and the third material is a terpolymer.

5. The co-injection extrusion apparatus of claim 1, wherein a controller controls the movement of the first plunger between the first plunger first position and the first plunger second position, the controller controls the movement of the second plunger between the second plunger first position and the second plunger second position.

6. The co-injection extrusion apparatus of claim 1, wherein a position controlled actuator with an activation member is attached to each of the first and second plungers.

7. The co-injection extrusion apparatus of claim 6, wherein the position controlled actuators are electro-mechanical valves driven by servo motors.

8. The co-injection extrusion apparatus of claim 1, wherein as the first plunger is moved to the first plunger first position, the first material is forced from the first lower portion of the first material delivery channel to the infeed of the die, and wherein as the first plunger is moved to the first plunger second position, the flow of the first material from the first lower portion of the first material delivery channel to the infeed of the die is slowed or stopped.

9. The co-injection extrusion apparatus of claim 8, wherein as the second plunger is moved to the second plunger first position, the second material is forced from the second lower portion of the second material delivery channel to the infeed of the die, and wherein as the second plunger is moved to the second plunger second position, the flow of the second material from the second lower portion of the second material delivery channel to the infeed of the die is slowed or stopped.

10. A co-injection extrusion apparatus comprising:
a die having an infeed;
a first extruder having a first screw;
a first material delivery channel for delivering a first material to the infeed of the die, the first material delivery channel having a first upper portion and a first lower portion, the first lower portion is positioned adjacent to the infeed of the die, the first screw is positioned in the first upper portion;

a first plunger positioned in the first lower portion of the first material delivery channel proximate the infeed of the die;

a second extruder having a second screw;

a second material delivery channel for delivering a second material to the infeed of the die, the second material delivery channel having a second upper portion and a second lower portion, the second lower portion is positioned adjacent to the infeed of the die and in line with the first lower portion, the second screw is positioned in the second upper portion;

a second plunger positioned in the second lower portion of the second material delivery channel proximate the infeed of the die;

the first plunger being movable between a first plunger extended position in which the first plunger is extended in the first lower portion of the first material delivery channel toward the infeed of the die, and a first plunger retracted position in which the first plunger is retracted in the first lower portion of the first material delivery channel away from the infeed of the die, wherein as the first plunger is moved to the first plunger extended position, the first material is forced from the first lower portion of the first material delivery channel to the infeed of the die, and wherein as the first plunger is moved to the retracted position, the first plunger configured to create a first area of vacuum or low pressure is provided in the first lower portion of the first material delivery channel and the flow of the first material from the first lower portion of the first material delivery channel to the infeed of the die is slowed or stopped;

the second plunger being movable between a second plunger extended position in which the second plunger is extended in the second lower portion of the second material delivery channel toward the infeed of the die, and a second plunger retracted position in which the second plunger is retracted in the second lower portion of the second material delivery channel away from the infeed of the die, wherein as the second plunger is moved to the second plunger extended position, the second material is forced from the second lower portion of the second material delivery channel to the infeed of the die, and wherein as the second plunger is moved to the second plunger retracted position, the second plunger configured to create a second area of vacuum or low pressure is provided in the second lower portion of the second material delivery channel when the second plunger and the flow of the second material from the second lower portion of the second material delivery channel to the infeed of the die is slowed or stopped;

a controller controls the movement of the first plunger between the first plunger extended position and the first plunger retracted position, the controller controls the movement of the second plunger between the second plunger extended position and the second plunger retracted position.

11. The co-injection extrusion apparatus of claim 10, wherein the die has an outer layer and an inner layer, the first material delivery channel and the second material delivery channel cooperating with the outer layer.

12. The co-injection extrusion apparatus of claim 11, wherein a third extruder and a third material delivery channel for delivering a third material to cooperate with the inner layer of the die.

13. The co-injection extrusion apparatus of claim 10, wherein a position controlled actuator with an activation member is attached to each of the first and second plungers.

14. The co-injection extrusion apparatus of claim 13, wherein the position controlled actuators are electro-mechanical valves driven by servo motors.

\* \* \* \* \*